(12) United States Patent
Fischer et al.

(10) Patent No.: US 10,007,684 B2
(45) Date of Patent: *Jun. 26, 2018

(54) GENERATING A VIEW FOR A SCHEMA INCLUDING INFORMATION ON INDICATION TO TRANSFORM RECURSIVE TYPES TO NON-RECURSIVE STRUCTURE IN THE SCHEMA

(71) Applicant: International Business Machines Corporation, Armonk, NY (US)

(72) Inventors: Jeffrey M. Fischer, Delray Beach, FL (US); John C. Holmes, Stratham, NH (US); Jeff J. Li, Parkland, FL (US); Yong Li, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

This patent is subject to a terminal disclaimer.

(21) Appl. No.: 14/546,975

(22) Filed: Nov. 18, 2014

(65) Prior Publication Data

US 2015/0193480 A1    Jul. 9, 2015

Related U.S. Application Data

(63) Continuation of application No. 14/148,624, filed on Jan. 6, 2014, now Pat. No. 9,594,779.

(51) Int. Cl.
*G06F 17/30* (2006.01)

(52) U.S. Cl.
CPC .. *G06F 17/30297* (2013.01); *G06F 17/30914* (2013.01)

(58) Field of Classification Search
CPC ......... G06F 17/30297; G06F 17/30914; G06F 17/30306

(Continued)

(56) References Cited

U.S. PATENT DOCUMENTS 5,999,187 A     12/1999    Dehmlow et al.
6,204,850 B1    3/2001     Green (Continued)

OTHER PUBLICATIONS

Office Action 1, dated Oct. 14, 2015, for U.S. Appl. No. 14/148,624, filed Jan. 6, 2014 by J.M. Fischer et al., Total 8 pp.

(Continued)

*Primary Examiner* — Md I Uddin
(74) *Attorney, Agent, or Firm* — David W. Victor; Konrad, Raynes, Davda & Victor LLP

(57) ABSTRACT

Provided are a computer program product, system, and method for generating a view for a schema. A schema provides a definition of elements, wherein at least one of the elements comprises a recursive element of a recursive data type, wherein the recursive data type allows for instances of the recursive element to include instances of that same recursive data type at different levels in a hierarchy. Indication is received to transform the recursive types to non-recursive structures. A view for the schema is generated including information on the indication to transform the recursive types to non-recursive structure, wherein the processing of the data defined by the view causes a parser to generate a structured element for each instance of the recursive element in schema data being parsed, wherein the generated structured element includes a unique identifier of the instance of the recursive element.

5 Claims, 14 Drawing Sheets

(58) Field of Classification Search
USPC .................................. 707/700, 796, 801, 803
See application file for complete search history.

(56) References Cited

U.S. PATENT DOCUMENTS

| | | | |
|---|---|---|---|
| 6,912,538 | B2 | 6/2005 | Stapel et al. |
| 7,043,487 | B2 | 5/2006 | Krishnamurthy et al. |
| 7,225,411 | B1* | 5/2007 | Stoner .............. G06F 17/30569 |
| | | | 707/999.003 |
| 7,877,416 | B2 | 1/2011 | Chari et al. |
| 8,150,893 | B2 | 4/2012 | Bohannon et al. |
| 8,209,361 | B2 | 6/2012 | Idicula et al. |
| 8,732,178 | B2 | 5/2014 | Holmes et al. |
| 8,762,424 | B2 | 6/2014 | Holmes et al. |
| 9,547,671 | B2 | 1/2017 | Fischer et al. |
| 9,552,381 | B2 | 1/2017 | Fischer et al. |
| 9,594,779 | B2 | 3/2017 | Fischer et al. |
| 9,607,061 | B2 | 3/2017 | Holmes et al. |
| 2001/0051948 | A1 | 12/2001 | Srinivasan et al. |
| 2002/0059566 | A1 | 5/2002 | Delcambre et al. |
| 2002/0087571 | A1 | 7/2002 | Stapel et al. |
| 2003/0204481 | A1 | 10/2003 | Lau |
| 2004/0015783 | A1 | 1/2004 | Lennon et al. |
| 2004/0044959 | A1 | 3/2004 | Shanmugasundaram et al. |
| 2004/0128296 | A1 | 7/2004 | Krishnamurthy et al. |
| 2006/0129583 | A1 | 6/2006 | Catorcini et al. |
| 2006/0282442 | A1 | 12/2006 | Lennon et al. |
| 2007/0073734 | A1 | 3/2007 | Doan et al. |
| 2007/0083538 | A1 | 4/2007 | Roy et al. |
| 2007/0143321 | A1 | 6/2007 | Meliksetian et al. |
| 2007/0143331 | A1 | 6/2007 | Holtz et al. |
| 2008/0134139 | A1 | 6/2008 | Krouse et al. |
| 2009/0006316 | A1 | 1/2009 | Fan et al. |
| 2009/0144293 | A1 | 6/2009 | Chowdhury |
| 2009/0248588 | A1 | 10/2009 | Hadi et al. |
| 2009/0249189 | A1 | 10/2009 | Jania et al. |
| 2010/0057760 | A1 | 3/2010 | Demant et al. |
| 2010/0235725 | A1 | 9/2010 | Drayton et al. |
| 2013/0191419 | A1 | 7/2013 | Holmes et al. |
| 2013/0191780 | A1 | 7/2013 | Holmes et al. |
| 2014/0059064 | A1 | 2/2014 | Holmes et al. |

OTHER PUBLICATIONS

U.S. Appl. No. 14/645,328, filed Mar. 11, 2015, entitled "Using Views of Subsets of Nodes of a Schema to Generate Data Transformation Jobs to Transform Input Files in First Data Formats to Output Files in Second Data Formats", by Holmes, J.C., et al., Total 46 pp.
Office Action 1, dated Oct. 21, 2015, for U.S. Appl. No. 14/645,328, filed Mar. 11, 2015 by J.C. Holmes et al., Total 19 pp.
Preliminary Amendment, dated Mar. 11, 2015, for U.S. Appl. No. 14/645,328, filed Mar. 11, 2015 by J.C. Holmes et al., Total 8 pp.
Response to Office Action, dated Jan. 14, 2016, for U.S. Appl. No. 14/148,624, filed Jan. 6, 2014 by J.M. Fischer et al., Total 10 pp.
Response to Office Action 1, dated Jan. 21, 2016, for U.S. Appl. No. 14/645,328, filed Mar. 11, 2015 by J.C. Holmes et al., Total 9 pp.
Office Action 1, dated Feb. 16, 2016, for U.S. Appl. No. 14/533,018, filed Nov. 4, 2014 by J.M. Fischer et al., Total 34 pp.
Office Action 1, dated Feb. 25, 2016, for U.S. Appl. No. 14/148,646, filed Jan. 6, 2014 by J.M. Fischer et al., Total 45 pp.
Response to Office Action 1, dated May 25, 2016, for U.S. Appl. No. 14/148,646, filed Jan. 6, 2014 by J.M. Fischer et al., Total 12 pp.
Office Action 2, dated May 6, 2016, for U.S. Appl. No. 14/148,624, filed Jan. 6, 2014 by J.M. Fischer et al., Total 11 pp.
Response to Office Action 1, dated May 16, 2016, for U.S. Appl. No. 14/533,019, filed Nov. 4, 2014 by J.M. Fischer et al., Total 9 pp.
Notice of Allowance, dated May 20, 2016, for U.S. Appl. No. 14/645,328, filed Mar. 11, 2015 by J.C. Holmes et al., Total 22 pp.
Foster, J.N., T.J. Green, and V. Tannen, "Annotated XML: Queries and Provenance", PODS'08, Jun. 9-12, 2008, Vancouver, BC, Canada, © 2008, ACM, Total 10 pp.
Notice of Allowance, dated Dec. 5, 2014, for U.S. Appl. No. 14/070,468, filed Nov. 1, 2013 by J.C. Holmes et al., Total 11 pp.
Preliminary Amendment, dated Nov. 4, 2014, for U.S. Appl. No. 14/533,019, filed Nov. 4, 2014 by J.M. Fischer et al., Total 7 pp.
Notice of Allowance, dated Oct. 28, 2016, for U.S. Appl. No. 14/148,624, filed Jan. 6, 2014 by J.M. Fischer et al., Total 33 pp.
Notice of Allowance 3, dated Nov. 18, 2016, for U.S. Appl. No. 14/645,328, filed Mar. 11, 2015 by J.C. Holmes et al., Total 11 pp.
U.S. Appl. No. 15/399,726, filed Jan. 5, 2017, entitled "Generating a View for a Schema Including Information on Indication to Transform Recursive Types to Non-Recursive Structure in the Schema", by Fischer, J.M., et al., Total 38 pp.
Preliminary Amendment, dated Jan. 5, 2017, for U.S. Appl. No. 15/399,726, filed Jan. 5, 2017 by J.M. Fischer et al., Total 8 pp.
Alur, N., C. Takahashi, S. Toratani, and D. Vasconcelos, "IBM InfoSphere DataStage Data Flow and Job Design", Jul. 2008, First Edition, © International Business Machines Corporation 2008, Total 658 pp.
Barnak, B., A. Bar-Or, C.M. Saracco, and P. Stanley, "IBM InfoSphere DataStage and DB2 pureXML, Part 1: Integrate XML Operational Data into a Data Warehouse", Aug. 20, 2009, © IBM Corporation 2009, Total 35 pp.
Barnak, B., A. Bar-Or, C.M. Saracco, and P. Stanley, "IBM InfoSphere DataStage and DB2 pureXML, Part 2: Building an XML-enabled Data Warehouse", Sep. 3, 2009, © IBM Corporation 2009, Total 19 pp.
Bar-Or, A. and S. Choudhary, "Using the XML Transformation Capabilities in IBM InfoSphere DataStage 8.5, Part 1: Transform XML Using the DataStage XML Stage: New Capabilities Parsin and Composing XML Files", © IBM Corporation 2011, Total 24 pp.
Bar-Or, A. and S. Choudhary, "Using the XML Transformation Capabilities in IBM InfoSphere DataStage 8.5, Part 2: Understanding the Assembly", © IBM Corporation 2011, Total 27 pp.
Bar-Or, A., and S. Choudhary, "Using the XML Transformation Capabilities in IBM InfoSphere DataStage 8.5, Part 3: Understanding Validation Rules", Apr. 28, 2011, IBM Corporation 2011, Total 17 pp.
Chen, L., X. Xiong, and D. Zhang, "Transform and Integrate Data Using WebSphere DataStage XML and Web Services Packs", Mar. 29, 2007, [online], [Retrieved on Jan. 5, 2012]. Retrieved from the Internet at <URL: http://www.ibm.com/developerworks/data/library/techarticle/dm-0703xiong/>, Total 35 pp.
IBM Corporation, "Annotated XML Schema Decomposition and Recursive XML Documents", DB2 Version 9.5 for Linux, UNIX, and Windows, [online], [Retrieved on Aug. 18, 2013]. Retrieved from the Internet at <URL: http://publib.boulder.ibm.com/infocenter/db2luw/v9r5/index.jsp?topic=%2Fcom.ibm.db2.luw.wn.doc%2Fdoc%2Fc0050661.html>, Total 5 pp.
Wikibooks, "XML—Managing Data Exchange/Recursive Relationships", [online], [Retrieved on Aug. 18, 2013]. Retrieved from the Internet at <URL: http://en.wikibooks.org/wiki/XML_-_Managing_Data_Exchange/Recurs>, Total 6 pp.
Xi, H. et al., "Distributed Supply Chain Simulation Using a Generic Job Running Framework", In Proceedings of the 2003 Winter Simulation Conference, 2003, 8 pp.
Office Action 1 for U.S. Appl. No. 13/358,421, dated Mar. 15, 2013, 20 pp.
Amendment 1 for U.S. Appl. No. 13/358,421, dated Jun. 10, 2013, 14 pp.
Notice of Allowance 1 for U.S. Appl. No. 13/358,421, dated Aug. 21, 2013, 17 pp.
Notice of Allowance 2 for U.S. Appl. No. 13/358,421, dated Oct. 11, 2013, 16 pp.
Office Action 1 for U.S. Appl. No. 13/401,614, dated Apr. 4, 2013, 16 pp.
Amendment 1 for U.S. Appl. No. 13/401,614, dated Jun. 10, 2013, 9 pp.
Notice of Allowance 1 for U.S. Appl. No. 13/401,614, dated Aug. 20, 2013, 17 pp.
Notice of Allowance 2 for U.S. Appl. No. 13/401,614, dated Oct. 25, 2013, 16 pp.
Office Action 1 for U.S. Appl. No. 13/358,426, dated Mar. 25, 2013, 17 pp.

(56) References Cited

OTHER PUBLICATIONS

Notice of Allowance 1 for U.S. Appl. No. 13/358,426, dated Sep. 4, 2013, 18 pp.
Response to Office Action 1 for U.S. Appl. No. 13/358,426, dated Jun. 25, 2013, 7 pp.
Amendment for U.S. Appl. No. 13/358,426, dated Dec. 4, 2013, 8 pp.
Office Action 1 for U.S. Appl. No. 13/401,679, dated Mar. 25, 2013, 15 pp.
Response to Office Action 1 for U.S. Appl. No. 13/401,679, dated Jun. 25, 2013, 5 pp.
Notice of Allowance for U.S. Appl. No. 13/401,679, dated Aug. 30, 2013, 15 pp.
US Application, filed Jan. 6, 2014, entitled "Generating a View for a Schema Including Information on Indication to Transform Recursive Types to Non-Recursive Structure in the Schema", by Fischer, J.M., et al., 38 pp.
U.S. Appl. No. 14/070,468, filed Nov. 1, 2013, entitled "Using Views of Subsets of Nodes of a Schema to Generate Data Transformation Jobs to Transform Input Files in First Data Formats to Output Files in Second Data Formats", by Holmes, J.C., et al., 46 pp.
US Application, filed Jan. 6, 2014, entitled "Limiting the Rendering of Instances of Recursive Elements in View Output", by Fischer, J.M., et al., Total pp.
Chen, W., et al., "DB2 9 pureXML Guide", IBM Redbook, Jan. 2007, 35 pp.
Notice of Allowance 3, dated Feb. 19, 2014, for U.S. Appl. No. 13/358,421, filed Jan. 25, 2012 by J.C. Holmes et al., Total 15 pp.
Notice of Allowance 2 for U.S. Appl. No. 13/358,426, dated Dec. 24, 2013, 14 pp.
Office Action 1, dated Feb. 13, 2014, for U.S. Appl. No. 14/070,468, filed Nov. 1, 2013 by J.C. Holmes et al., Total 13 pp.
Final Office Action 1, dated Jul. 16, 2014, for U.S. Appl. No. 14/070,468, filed Nov. 1, 2013 by J.C. Holmes et al., Total 16 pp.
Supplemental Amendment to Final Office Action 1, dated Oct. 16, 2014, for U.S. Appl. No. 14/070,468, filed Nov. 1, 2013 by J.C. Holmes et al., Total 6 pp.
Amendment 2, dated Jan. 10, 2014, for U.S. Appl. No. 13/358,421, filed Jan. 25, 2012 by J.C. Holmes et al., Total pp.
Preliminary Amendment, dated Nov. 4, 2014, for U.S. Appl. No. 14/148,646, filed Jan. 6, 2014 by J.M. Fischer et al., Total 8 pp.
US Application, filed Jan. 6, 2014, entitled "Generating a View for a Schema Including Information on Indication to Transform Recursive Types to Non-Recursive Structure in the Schema", by Fischer, J.M., et al., Total 38 pp.
US Application, filed Nov. 4, 2014, entitled "Limiting the Rendering of Instances of Recursive Elements in View Output", by J.M. Fischer et al., Total 39 pp.
Preliminary Amendment, dated Nov. 18, 2014, for U.S. Appl. No. 14/148,624, filed Jan. 6, 2014 by J.M. Fischer et al., Total 6 pp.
Notice of Allowance, dated Sep. 12, 2016, for U.S. Appl. No. 14/148,646, filed Jan. 6, 2014 by J.M. Fischer et al., Total 21 pp.
Response to Office Action 2, dated Aug. 8, 2016, for U.S. Appl. No. 14/148,624, filed Jan. 6, 2014 by J.M. Fischer et al., Total 13 pp.
Notice of Allowance, dated Sep. 13, 2016, for U.S. Appl. No. 14/533,019, filed Nov. 4, 2014 by J.M. Fischer et al., Total 17 pp.
Notice of Allowance 2, dated Jul. 20, 2016, for U.S. Appl. No. 14/645,328, filed Mar. 11, 2015 by J.C. Holmes et al., Total 12 pp.

\* cited by examiner

```
<xsd:schema xmlns:xsd="http://www.w3.org/2001/XMLSchema">

<xsd:element name="employee" type="EmployeeType"/>

<xsd:complexType name="EmployeeType">
    <xsd:sequence>
        <xsd:element name="manages" type="EmployeeType" minOccurs="0" maxOccurs="unbounded" />
    </xsd:sequence>
    <xsd:attribute name="name" type="xsd:string" />
    <xsd:attribute name="employeeID" type="xsd:ID" />
    <xsd:attribute name="title" type="JobType" />
</xsd:complexType>

<xsd:simpleType name="JobType">
    <xsd:restriction base="xsd:string">
        <xsd:pattern value="Executive|Second Line Manager|First Line Manager|Administrative Assistant|Project Manager|Developer" />
    </xsd:restriction>
</xsd:simpleType>

</xsd:schema>
```

FIG. 2

```
<employee employeeID="id00" name="Adam" title="Executive" xmlns:xsi="http://w
  <manages employeeID="id01" name="Betty" title "Administrative Assistant" />
  <manages employeeID="id02" name="Charles" title="Second Line Manager">
    <manages employeeID="id03" name="Doris" title="First Line Manager">
      <manages employeeID="id04" name="Ed" title="Developer" />
      <manages employeeID="id05" name="Francis" title="Developer" />
      <manages employeeID="id06" name="Gary" title="Developer" />
    </manages>
    <manages employeeID="id07" name="Harriet" title="First Line Manager">
      <manages employeeID="id08" name="Irving" title="Developer" />
      <manages employeeID="id09" name="Jeff" title="Developer" />
      <manages employeeID="id10" name="Kiera" title="Developer" />
    </manages>
    <manages employeeID="id11" name="Larry" title="Project Manager" />
  </manages>
```

Create View — 700

| Name:* | ThreeLevelsOfManagement |
| Description: | Example View with Chunking |

ⓘ Select the nodes you need in the view. Required related nodes with be auto-selected.

| Source Node 706 | Include in View | Include All Descendants | Chunk |
|---|---|---|---|
| ▼ 👥 employee | ☑ ☒ | ☐ 708 | |
| 7021 ▼ 🗐 manages | ☑ ☒ | ☐ | ☐ |
| ▼ text() | ☑ ☒ | ☐ | ☐ |
| 7022 ▼ 🗐 manages | ☑ ☒ | ☐ | ☐ |
| ▼ text() | ☑ ☒ | ☐ | ☐ |
| 7023 ▼ 🗐 manages | ☑ ☒ | ☐ | ☐ |
| ▼ text() | ☑ ☒ | ☐ 710 | ☐ |
| 7024 ▶ 🗐 manages | ☑ | | ☑ ◇ |
| @name | ☑ | | |
| @employeeID | ☑ | | |
| @title | ☑ | | |
| @@isPresent | ✓ | | |
| @name | ☑ | | |
| @employeeID | ☑ | | |
| @title | ☑ | | |
| @@isPresent | ✓ | | |
| @name | ☑ | | |
| @employeeID | ☑ | | |
| @title | ☑ | | |
| @@isPresent | ✓ | | |
| @name | ☑ | | |
| @employeeID | ☑ | | |
| @title | ☑ | | |

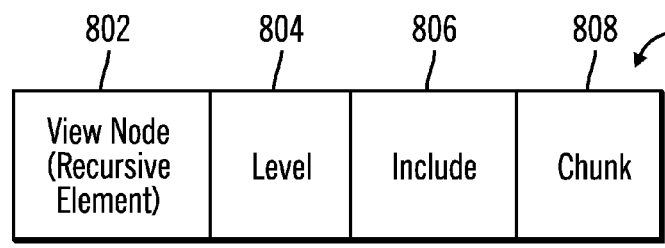

| 802 | 804 | 806 | 808 |
|---|---|---|---|
| View Node (Recursive Element) | Level | Include | Chunk |

View Node Information

FIG. 8

```
<employee employeeID="id00" name="Adam"     title="Executive"                parentId=""/>
<employee employeeID="id01" name="Betty"    title="Administrative Assistant" id="2"  parentId="1"/>
<employee employeeID="id02" name="Charles"  title="Second Line Manager"      id="3"  parentId="1"/>
<employee employeeID="id03" name="Doris"    title="First Line Manager"       id="4"  parentId="3"/>
<employee employeeID="id04" name="Ed"       title="Developer"                id="5"  parentId="4"/>
<employee employeeID="id05" name="Francis"  title="Developer"                id="6"  parentId="4"/>
<employee employeeID="id06" name="Gary"     title="Developer"                id="7"  parentId="4"/>
<employee employeeID="id07" name="Harriet"  title="First Line Manager"       id="8"  parentId="3"/>
<employee employeeID="id08" name="Irving"   title="Developer"                id="9"  parentId="8"/>
<employee employeeID="id09" name="Jeff"     title="Developer"                id="10" parentId="8"/>
<employee employeeID="id10" name="Kiera"    title="Developer"                id="11" parentId="8"/>
<employee employeeID="id11" name="Larry"    title="Project Manager"          id="12" parentId="3"/>
```

FIG. 15

GENERATING A VIEW FOR A SCHEMA INCLUDING INFORMATION ON INDICATION TO TRANSFORM RECURSIVE TYPES TO NON-RECURSIVE STRUCTURE IN THE SCHEMA

CROSS-REFERENCE TO RELATED APPLICATION

This application is a continuation of U.S. patent application Ser. No. 14/148,624, filed Jan. 6, 2014, which application is incorporated herein by reference in its entirety.

BACKGROUND OF THE INVENTION

1. Field of the Invention

The present invention relates to a computer program product, system, and method for generating a view for a schema including information on indication to transform recursive types to non-recursive structure in the schema.

2. Description of the Related Art

An Extensible Markup Language (XML) schema is a description of elements in a document encoded using the XML language. The XML schema may also be used to define a data model, also known as a meta model comprising a definition of a hierarchical representation of nodes that represent the data and relationship of data content for a data model. XML schemas that define more complex data models may have 1000s of nodes arranged in a complex hierarchy of trees of nodes. A large scale schema may be comprised of multiple XML Schema Definition (XSD) files and provides a definition of large scale trees of nodes and data content.

An XML schema may include a recursive data type. An XML schema is said to be recursive when the type definition allows for elements of the same name and type to appear in their own definition. Recursion may be explicit or implicit such that recursive elements defined with the recursive data type will themselves contain other instances of that same type. The presence of recursive types significantly increases the complexity of specifying transformations between XML datasets as well as between XML datasets and datasets with non-hierarchical formats such as relational. The XML schemas which define the structure of XML data represent the recursive data structures via recursive type definitions. Transformations to, from, and between XML datasets are typically specified as mappings to and from the types defined in the XML schemas. Such mappings serve to document the relationships between datasets and also provide the basis for automated transformation tools that convert one dataset into another. But in the presence of recursive types, simple mappings are inherently ambiguous since it can be unclear which, and how many, levels of recursive structure are being mapped.

SUMMARY

Provided are a computer program product, system, and method for generating a view for a schema including information on indication to transform recursive types to non-recursive structure in the schema. A schema provides a definition of elements, wherein at least one of the elements comprises a recursive element of a recursive data type, wherein the recursive data type allows for instances of the recursive element to include instances of that same recursive data type at different levels in a hierarchy. Indication is received to transform the recursive types to non-recursive structures. A view for the schema is generated including information on the indication to transform the recursive types to non-recursive structure, wherein the processing of the data defined by the view causes a parser to generate a structured element for each instance of the recursive element in schema data being parsed, wherein the generated structured element includes a unique identifier of the instance of the recursive element.

BRIEF DESCRIPTION OF THE DRAWINGS

FIG. 2 illustrates an example of a snippet of schema defining elements.

FIG. 3 illustrates an example of a snippet of generated structured XML elements.

FIGS. 6 and 7 illustrate embodiments of a GUI to define elements to include in a view.

FIG. 8 illustrates an embodiment of view node information.

FIG. 15 illustrates an embodiment of output from parsing the schema according to FIG. 14.

DETAILED DESCRIPTION

Described embodiments provide techniques to generate a view for a schema to limit a number of levels at which recursive elements are expanded in a view by allowing the view to have instances of recursive elements chunked upon satisfying a condition for terminating recursion to allow the user to control the level at which instances of structured recursive elements are generated into the view output. Further embodiments provide techniques for transforming hierarchical recursive type elements to non-recursive type elements where hierarchical information is encoded in attributes of the non-recursive type elements.

Figure 1:
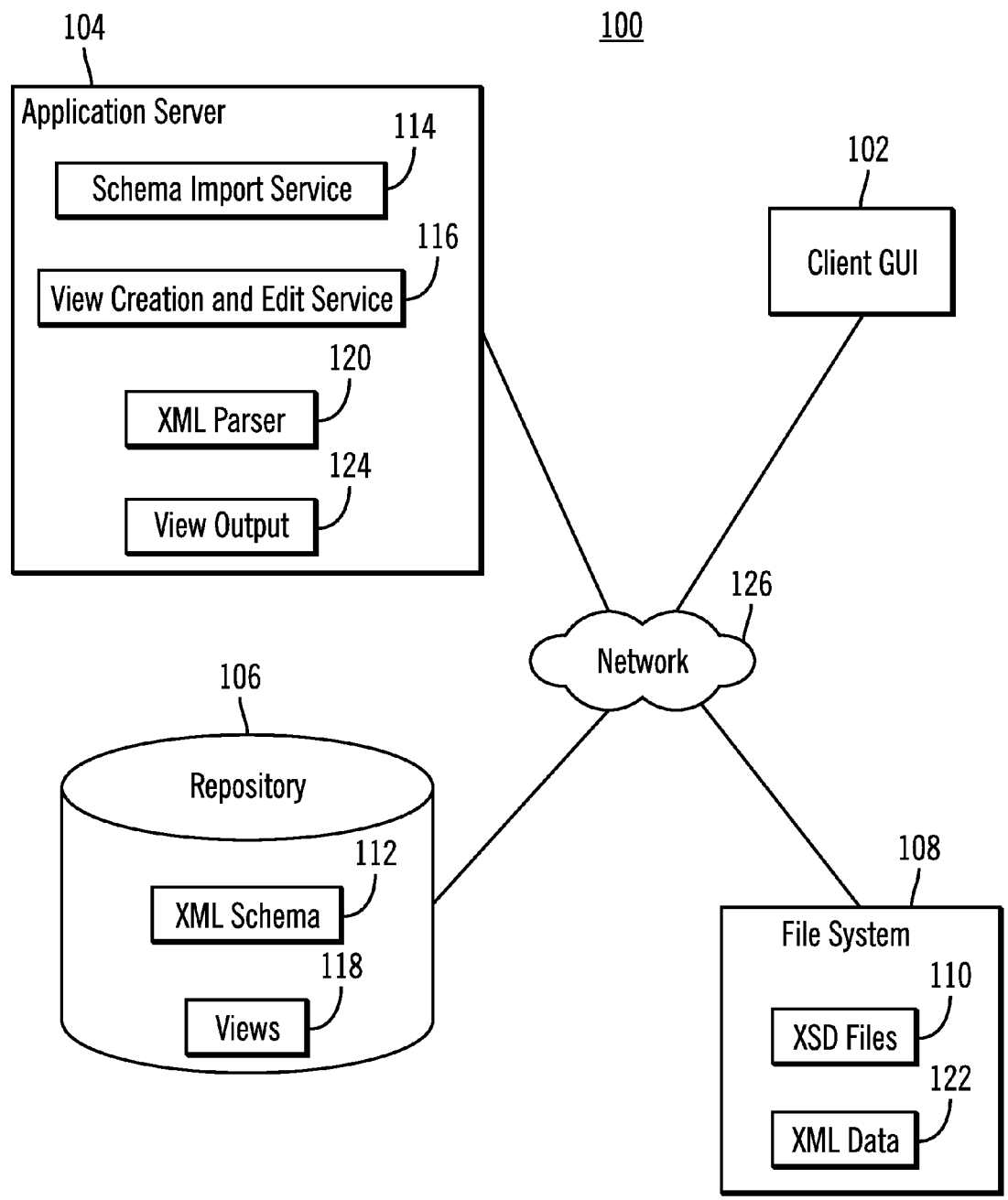
FIG. 1 illustrates an embodiment of a computing environment.

FIG. 1 illustrates an embodiment of a computing environment 100 including a computer with a client web graphical user interface (GUI) 102, an application server 104, a repository 106, and a file system 108. Users access the client GUI 102 to import XSD files 110 from file system 108 and save the XML schema 112 defined by the XSD files 110 to the repository 106. The client GUI 102 invokes the schema import service 114 deployed on the application server 104 to import XSD files 110. A user at the client GUI 102 further invokes the view creation and edit service 116 to create views 118 of an XML schema 112 and save the views 118 to the central repository 106. The client GUI 102 invokes the view creation and edit service 116 deployed on the application server 104 to create and edit views 118.

The user accesses the GUI 102 to invoke an XML parser 120 to parse XML data 122, comprising an implementation of the XML schema 112, according to the view 118 to generate XML view output 124 comprising a defined view of the XML elements from the XM data 122.

The application server 104, client GUI 102, repository 106, and file system 108 may interconnect over a network 126. The components of FIG. 1 may be implemented with suitable computing architectures. In one embodiment, the client GUI 102 may be web based, invoking the services 114, 116, and 120 using SOAP (Simple Object Access Protocol) web services or Hypertext Transport Protocol (HTTP) based Representational State Transfer (REST) services. In one embodiment, the client GUI 102 and the services 114, 116, and 120 may be integrated into one standalone application or distributed in multiple application components. The repository 106 may comprise a relational database or a non-relational database.

The repository 106 and file system 108 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The repository 106 and file system 108 may be implemented in the same or different storage devices. The network 126 may comprise an interconnected network (e.g., Intranet, Internet, Local Area Network (LAN), Storage Area Network (SAN), etc.).

In described embodiments, the schema 112 comprises an XML schema. In alternative embodiments, the schema 112 may be implemented in suitable structured document definition languages other than XML. Further, the XML schema may comprise a text-based meta-language for describing data shared between applications as defined for an industry group.

The views 118, created by the view creation and edit service 116, and stored in the repository 106, include a schema identifying the schema 112 from which the view 118 was generated and nodes corresponding to nodes or elements selected from the schema 112. Each view node in a view 122 has a matching node in the schema 112. The view nodes include information on how to render the nodes from the schema, corresponding to elements in the schema, in the view output 124, i.e., whether to include, chunk or generate structured elements for the instances of the elements corresponding to the view nodes.

FIG. 2 illustrates an embodiment of a snippet of a schema definition 200 having a recursive definition for the recursive element "manages" 206, which has an XML type of EmployeeType 204. The recursive element "manages" 206 defines a relationship that an employee can manage multiple other employees which can have their own recursive element "manages".

FIG. 3 illustrates XML data 122 having data for the schema definition 200 of FIG. 2, showing an instance of an employee element 302 and then recursive instances of the "manages" element 304 of employees that manage other employees, and so on. Described embodiments concern operations to transform the XML data 122, such as the data 300, into a relational data set or other formats to be stored in a relational or other types of databases.

Figure 4:
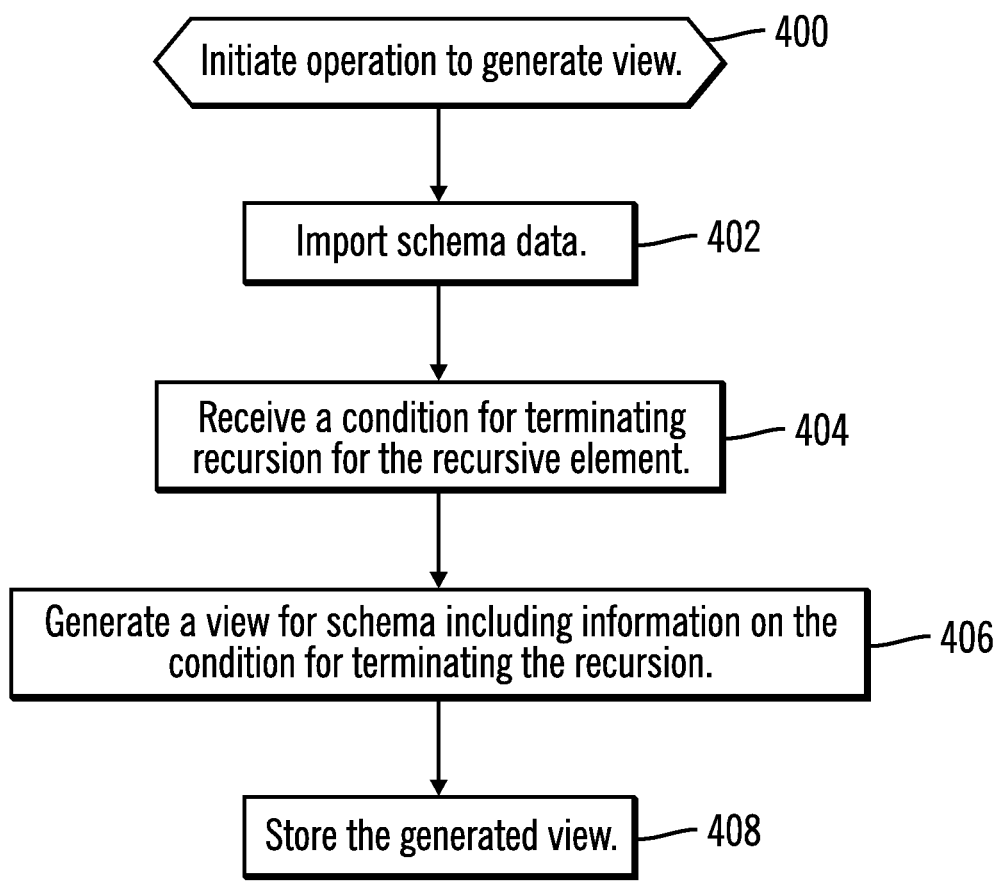
FIGS. 4 and 12 illustrate embodiments of operations to generate a view for a schema.

FIG. 4 illustrates an embodiment of operations performed by the view creation and edit service 116 to generate a view 118 to terminate recursion of structured recursive elements at a certain level. Upon initiating (at block 400) an operation to generate a view 118, a schema 112 is imported (at block 402). The view creation and edit service 116 receives (at block 404) a condition for terminating recursion for a recursive element in the imported XML data 122. A view 118 for the schema including information on the condition for terminating the recursion is generated (at block 406) and the generated view 118 is stored (at block 408) in the repository 106.

Figure 5:
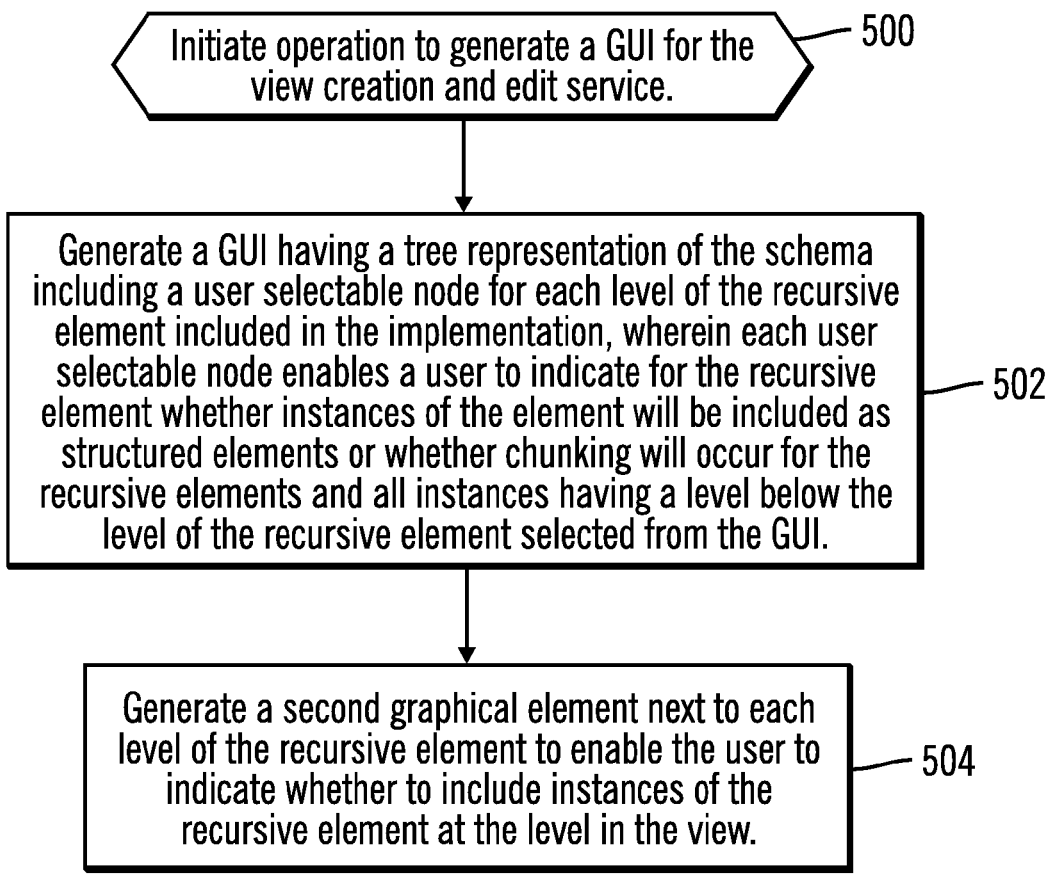
FIG. 5 illustrates an embodiment of operations to generate a graphical user interface (GUI) to create a view.

FIG. 5 illustrates an embodiment of operations performed by the view creation and edit service 116 to provide a graphical user interface (GUI) to enable a user to select through the GUI the condition for terminating recursion. Upon initiating (at block 500) an operation to generate a GUI for the view creation and edit server 116, such as the GUI 600 shown in FIG. 6 and GUI 700 shown in FIG. 7, the view creation and edit service 116 generates (at block 502) a GUI having a tree representation of nodes for the elements in the XML schema 112, including a user selectable node for each level of the recursive element in the XML schema 112. Each user selectable node enables a user to expand the recursive element at the level associated with the node to have instances of that recursive level at that level included as structured elements in the view output 124 or whether chunking will occur for the recursive elements and all instances having a level below the level of the recursive element selected from the GUI.

Figure 6:
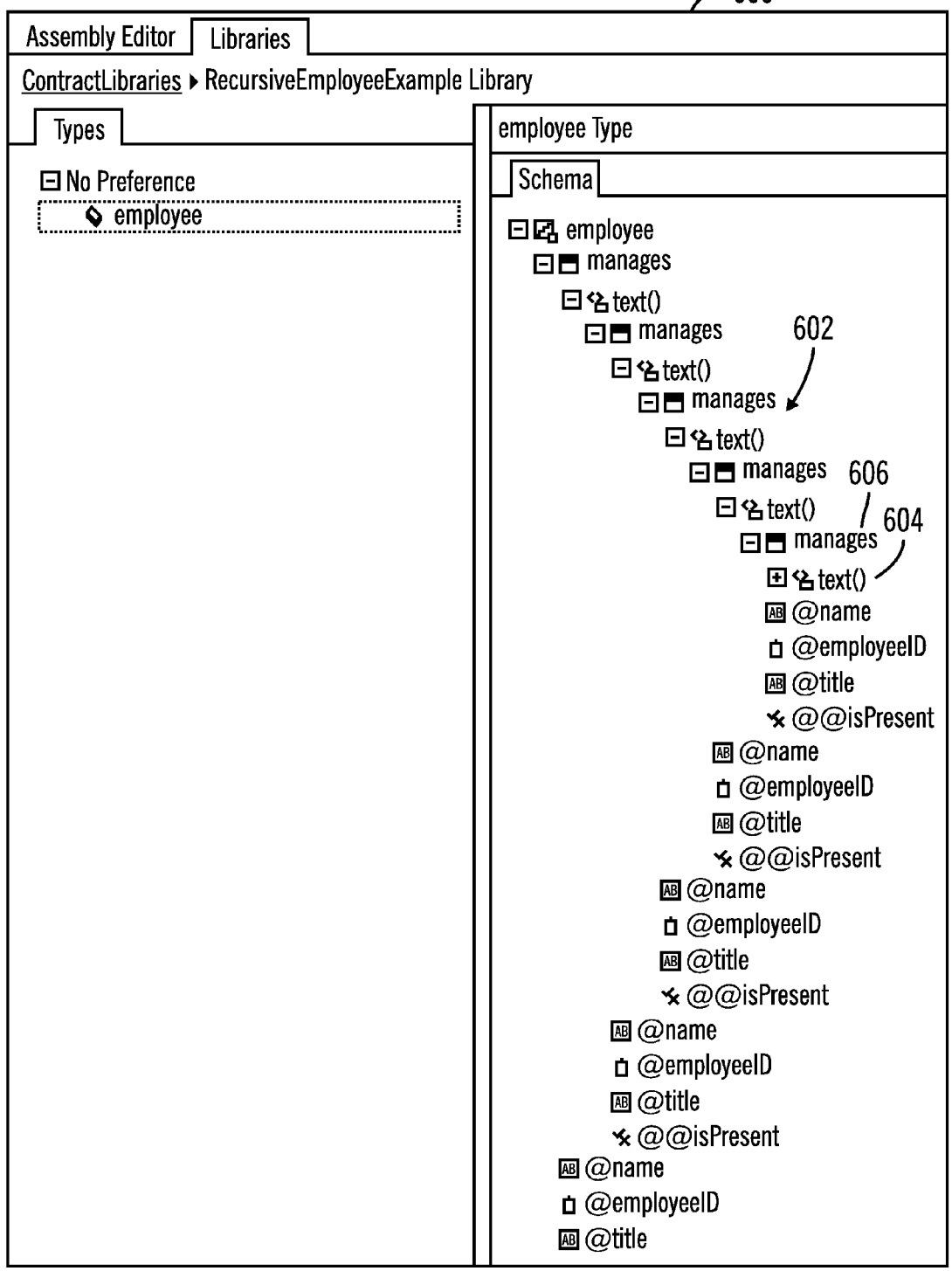

For instance, the GUI 600 in FIG. 6 shows a tree representation 602 of the employee elements and "manages" recursive elements in the XML schema 112. FIG. 6 shows user selectable nodes for the employee and manages recursive element that allows the user to selectively unwind that element by clicking the plus sign ("+") adjacent to the manages element, once the plus sign is selected, the negative sign ("–") is displayed as shown in FIG. 6 showing that that element has been unwound at that level. When the user selects to "unwind" the "manages" recursive element, all the attributes for that element are shown. By selecting to unwind a node representing a recursive element, the user has selected to include that level of the recursive element as a structured element generated into any view output 124. The user has indicated in the GUI 600 to include five levels of instances of the recursive element because five levels of the manages recursive element are shown as "unwound". The user has also selected to chunk below the fifth level by not unwinding the text attribute 604 below the fifth instance of the "manages" recursive element 606 to allow expansion beyond the fifth level of the manages recursive element. In this way, the user has selected to chunk below the fifth level of instances of the recursive element. Chunking at a level and all levels beyond that chunked level causes the parser 120 to output the recursive elements as text in a string, and not as structured elements in the schema language, e.g., XML.

FIG. 7 illustrates another embodiment of the GUI 700 having nodes, e.g., $702_1$, $702_2$, $703_3$, $704_4$, for each level of the manages recursive element in the XML schema 112. The user may select to include instances that level of the recursive element in the view 116 by toggling the arrow graphical element to the left of each of the nodes $702_1$, $702_2$, $703_3$, $704_4$. A downward pointing arrow graphical element, such as for the nodes $702_1$, $702_2$, $703_3$, indicates that those levels have been expanded to include in the view, by not toggling the arrow for the recursive element $704_4$, the user has selected to chunk below that fourth level. The user may also indicate to not include a level of a recursive element in the view by selecting the check boxes in the include column 706. If the include box is checked, than instances for that level of the manages recursive element is included in the view output 124, otherwise if unchecked, instances of that level of recursive element are not included in the view output 124. If the level of the instance of the recursive element is included in the view output 124, then the user may select the box in the chunk column 708 to indicate that instances of the recursive element at the corresponding level of the selected chunk box 710, e.g., the manages element 702$_4$ at the fourth level and levels beyond the fourth level are to be chunked.

The user may use command lines to provide instructions for a level of the recursive element at which instances of the recursive element in the XML schema 112 will be chunked. For instance, the user may specify a maximum level up to which instances of the specified recursive element will be generated into the view output 124, such that instances for levels of the recursive element beyond the user specified maximum level are chunked, meaning their data is included in a string as text, not as nested XML structured elements.

FIG. 8 illustrates an embodiment of view node information 800 included in the view 122 being generated based on the level at which the user selected to chunk a particular recursive element, which may be specified through a GUI, such as shown in FIGS. 6 and 7. The view node information 800 for one node includes a view node name 802, such as for a recursive element; a level 804 in the recursive nodes; an include field 806 indicating whether instances of the recursive element corresponding to the view nod 802 are included in the view 118; and a chunk field 808 indicating whether instances of corresponding recursive element at the corresponding level 804 are chunked. If not indicated as chunked, then instances of the recursive element corresponding to the view node 802 are generated as structured XML elements into the view output 124.

Figure 9:
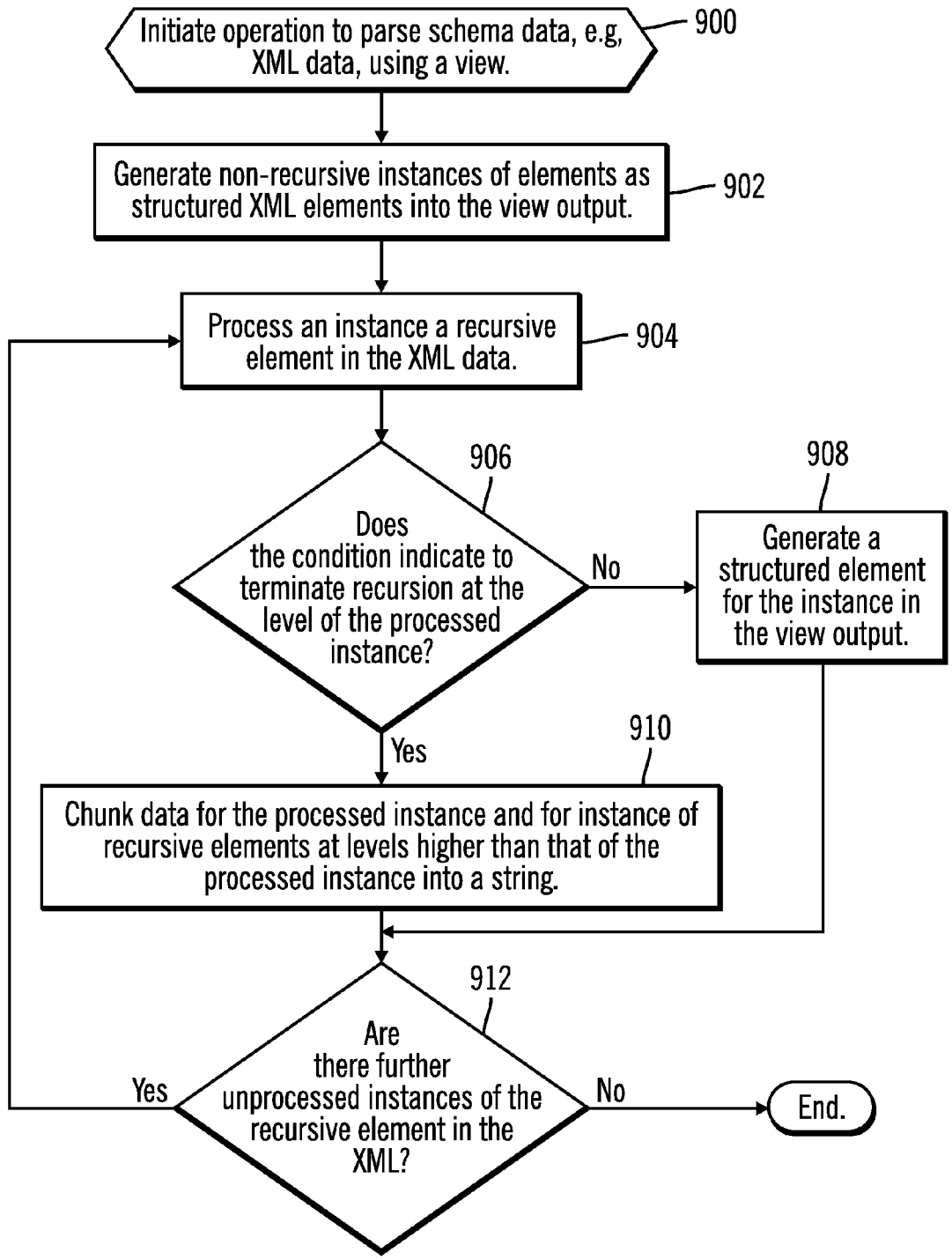
FIG. 9 illustrates an embodiment of operations to parse data for a schema using a view.

FIG. 9 illustrates an embodiment of operations performed by the XML parser 120 to parse the XML data 122, i.e., schema 112 data, according to one of the views 118 having a termination condition for a recursive element to generate view output 124 during parsing runtime. Upon initiating (at block 900) an operation to parse the XML data 122 according to a view 118, the XML parser 120 may process (at block 902) non-recursive elements and attributes and generate them as structured elements, e.g., structured XML data, into the view output 124. Upon processing (at block 904) an instance of a recursive element in the XML data 122, e.g., manages, if (at block 906) a termination condition indicates to not terminate recursion at the level of the processed instance, i.e., chunking was not selected for that level, then the XML parser 120 generates (at block 908) a structured element for the instance into the view output 124. Otherwise, if the level of the processed instance of the recursive element is to be chunked, then the XML parser 120 chunks (at block 910) data for the processed instance and for instances of recursive elements at higher levels of recursion within the instance processed into a string as text. The string data of chunked instances of recursive elements may be logged, included into the view output 122, discarded, etc. From block 908 or 910, if (at block 912) there are further unprocessed instances of the recursive element in the XML data 122, then control proceeds back to block 904 to process that further instance, else, control ends.

In this way, the XML parser 120 will recognize non-nested (top level) instances of the recursive type, parse the contents of those instances, and emit the XML structure corresponding to those instances. Nested instances of the recursive type will also be parsed and emitted as XML structure as long as the user specified recursion level has not been reached. Once the maximum prescribed recursion level has been reached, the parser 120 chunks the nested instances at and below that level, and does not parse the nested instance's components. Instead, the parser 120 emits a string representation of the nested instance (including any additional instances nested within the current one) rather than emitting an XML structure.

In a further embodiment to specify the termination condition, the user may supply via a GUI or command line interface a predicate for each recursive type and that predicate specifies the condition under which instances of the recursive element are chunked or not outputted as structured element instances, XML structures. In one embodiment the predicate may be coded as an annotation in the view schema, e.g., "<xsd:annotation><xsd:appinfo>predicate</xsd:appinfo></xsd:annotation>". These termination condition annotations may be attached to the type definitions in the view 118 schema definitions so that the predicates can be evaluated at runtime.

When the XML parser 120 recognizes an instance of the recursive type, the parser evaluates the predicate. If the predicate evaluates to true then the parser emits the XML structure corresponding to the instance and continues parsing the instance's components. If the predicate evaluates to false then the parser chunks the instance; it does not parse the instance's components, and the parser emits a string representation of the instance rather than emitting an XML structure.

Figure 10:
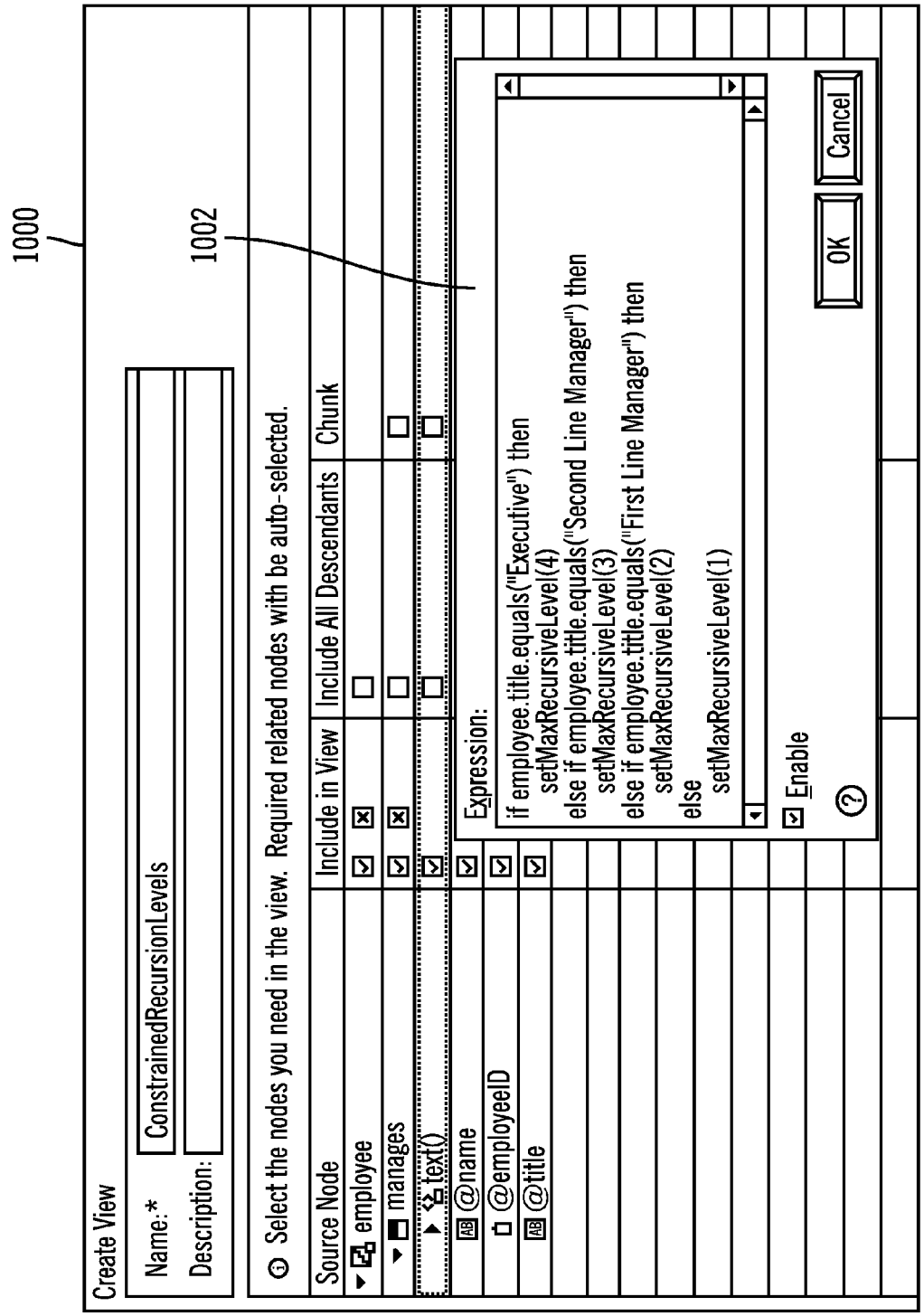
FIG. 10 illustrates an embodiment of a GUI to define termination conditions for a recursive element.

FIG. 10 illustrates an embodiment of a GUI 1000 in which the user has entered an expression 1002 specifying termination conditions for the "manages" recursive element where the user has created a predicate expression that specifies different levels of the recursive element at which to terminate recursion for different values of an attribute of the recursive element. For instance, if the employee title attribute for an employee managing another employee is "executive", then recursion is terminated at level four, allowing four recursive levels instances of the recursive element "manages" for executive employees to be generated as structured XML elements, e.g., with tags and markup, into the view output 124. After the fourth level, the instances of the manager recursive element are chunked. The expression 1002 also specifies that if the manager employee is a "second line manager" than there are three levels of instances of the recursive element "manages" generated as structured XML elements. Otherwise, if the type of the employee is not specified, only one level of instances of that type of "manages" are generated as structured elements in the view output 122.

Figure 11:
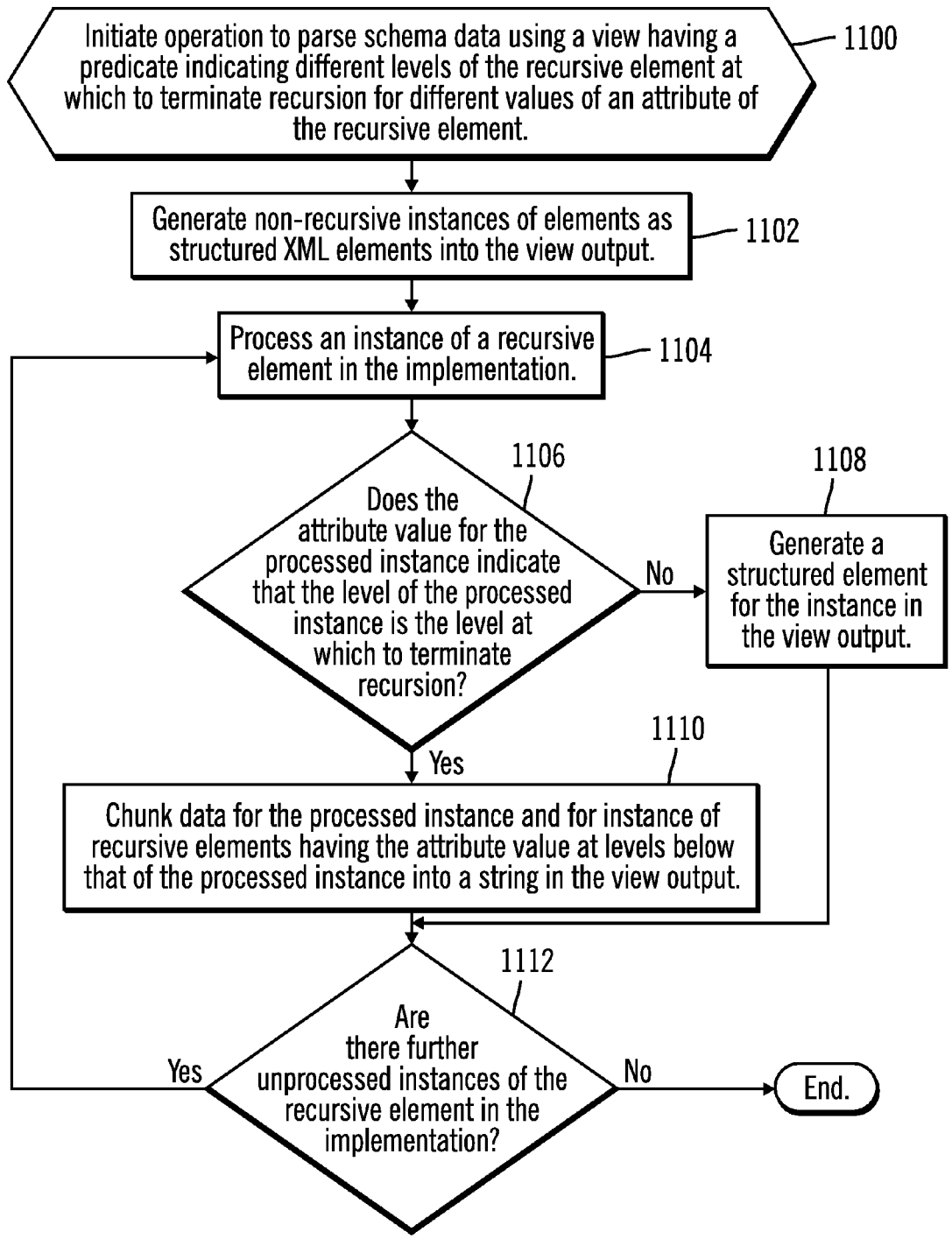
FIG. 11 illustrates an embodiment of operations to parse data for a schema.

FIG. 11 illustrates an embodiment of operations performed by the XML parser 120 to parse XML data 122 for a view 118 that includes a termination condition comprising a predicate providing specifying termination at different levels of recursion for different attributes of the recursive element, such as shown in the expression 1002 in FIG. 10. Upon initiating (at block 1100) an operation to parse XML data 122 using a view 118 having a predicate indicating different levels of the recursive element at which to terminate recursion for different values of an attribute of the recursive element, the XML parser 120 may process (at block 1102) non-recursive elements and attributes and generate them as structured elements, e.g., structured XML data, into the view output 124. Upon processing (at block 1104) an instance of a recursive element in the XML data 122, e.g., manages, if (at block 1106) the attribute value for the processed instance indicates that the level of the processed instance is not the level at which to terminate recursion, then the XML parser 12 generates (at block 1108) a structured element for the instance in the view output 124. Otherwise, if (at block 1106) the attribute value for the processed instance indicates that recursion should be terminated for the level of the processed instance, then the XML parser 120 chunks (at block 1110) data for the processed instance and for instances of recursive elements at higher levels of recursion within the instance processed into a string as text. From block 1108 or 1110, if (at block 1112) there are further unprocessed instances of the recursive element in the XML data 122, then control proceeds back to block 1104 to process that further instance, else, control ends.

In a further embodiment, the XML parser 120 may be configured to transform hierarchically structured data, such as recursive elements, to a flat, relational dataset where the XML output may be readily transformed to relational data for a relational database.

Figures 12, 13:
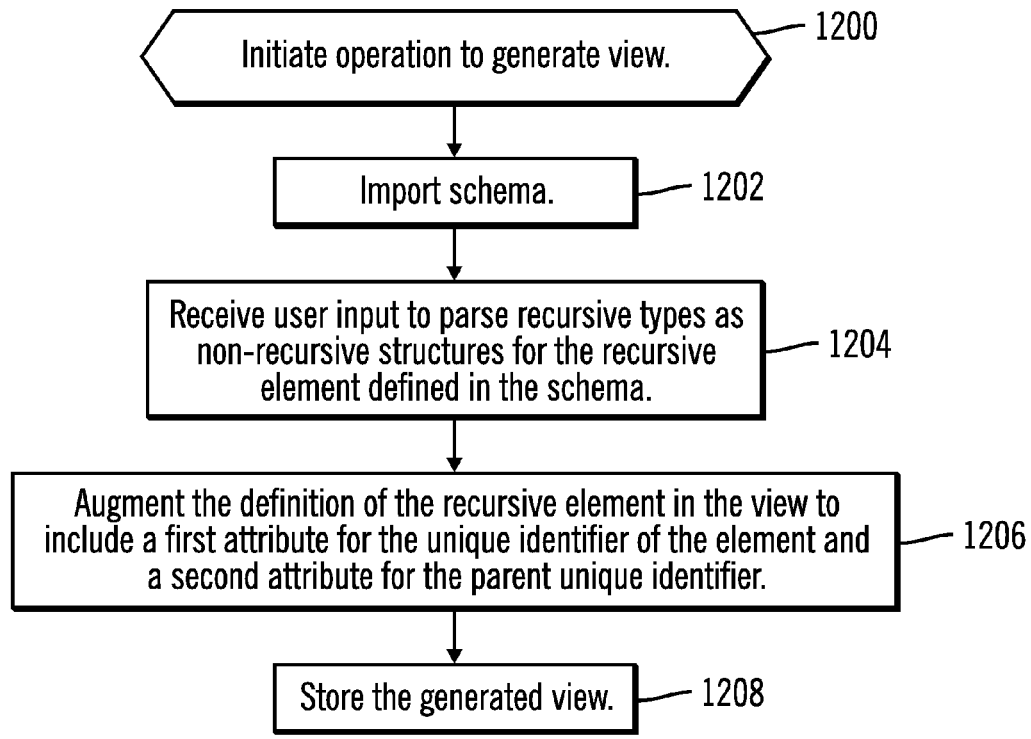
FIG. 13 illustrates an embodiment of a schema definition to transform recursive structures to non-recursive structures.

FIG. 12 illustrates an embodiment of operations performed by the view creation and edit service 116 to augment the XML element definitions in the view 118 schema to allow for the transformation of recursive hierarchical elements to flat, non-hierarchical data, when parsing the XML data 112. Upon initiating (at block 1200) an operation to generate a view 118, the schema 112 is imported (at block 1202). The view creation and edit service 116 receives (at block 1204) user input parse recursive types as non-recursive structures for the recursive element defined in the schema. The view creation and edit service 116 augments (at block 1206) the definition of the recursive element in the view 118 schema to include a first attribute for the unique identifier of the element and a second attribute for the parent unique identifier. The generated view 118 is then stored (at block 1208)

FIG. 13 illustrates an example of how the schema 112 having the definition of the manages recursive EmployeeType definition shown in FIG. 2 may be augmented in the definition 1300 in the view 118 to include as attributes a unique ID 1302 and parent ID 1304 having the unique ID of the parent to the recursive element. Further, the definition 1300 does not include a recursive definition such as shown in FIG. 2 for the EmployeeType having an unbounded 208 number of occurrences. In this way, the element definition of the recursive element in the view 118 schema is flattened, and hierarchical information is encoded in the parent ID 1302 attribute indicating a hierarchical parent to an EmployeeType instance.

Figure 14:
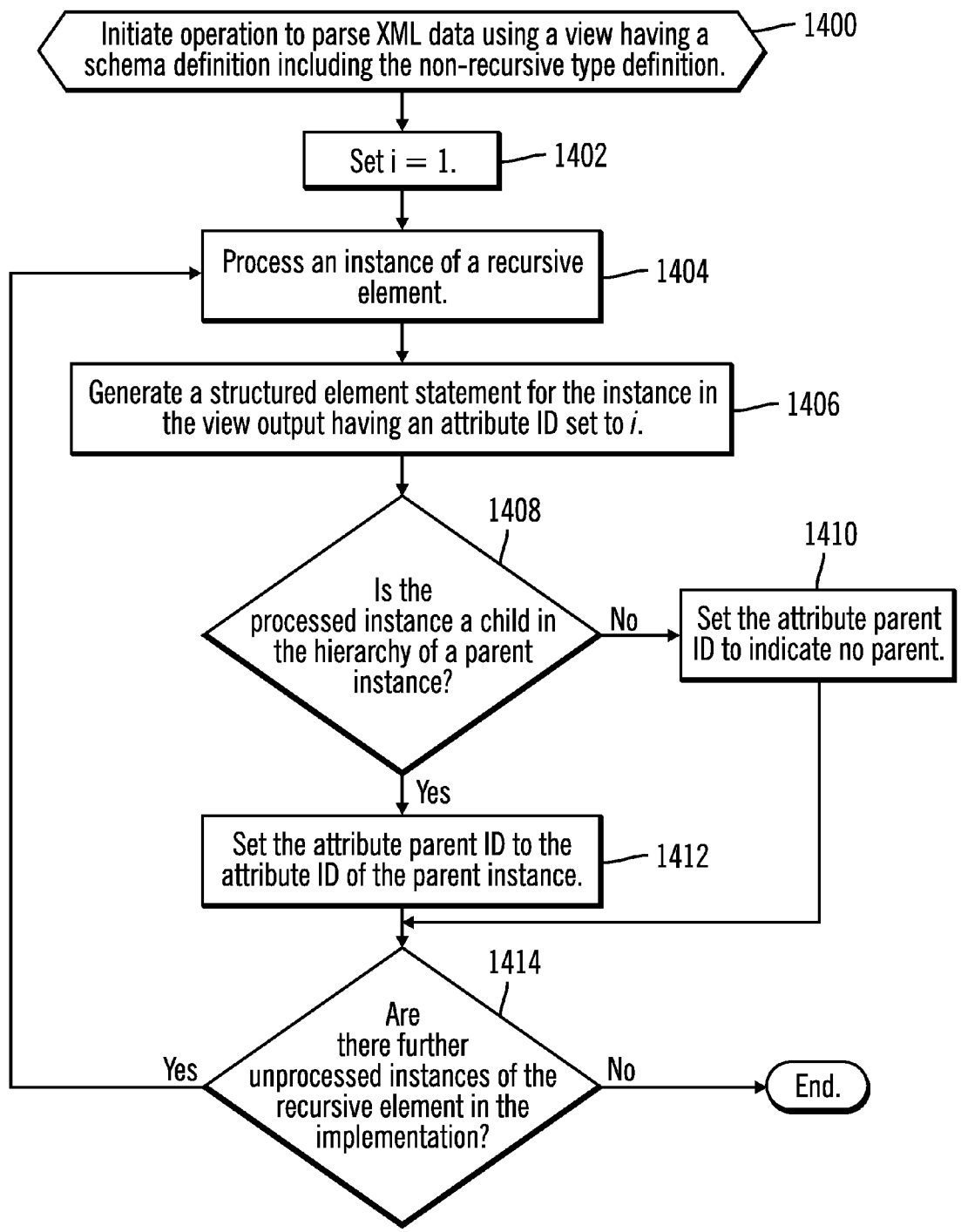
FIG. 14 illustrates an embodiment of operations to parse schema data and a view for the schema when the schema definition includes a non-recursive type definition for the previously defined recursive elements.

FIG. 14 illustrates an embodiment of operations performed by the XML parser 120 to process XML data 122 and a view including the augmented schema definition, such as shown in FIG. 13. Upon initiating (at block 1400) an operation to parse based on a view 118 having a schema definition including the non-recursive type definition with XML data having instances of the recursive element, the XML parser 120 sets (at block 1402) a variable i to 1, which is used to determine the unique ID 1302 for the recursive element. Upon processing (at block 1404) an instance of the recursive element in the XML data 122, the XML parser 120 generates (at block 1406) a structured element XML statement for the element having an ID attribute 1302 set to i. If (at block 1408) the processed instance is not a child to a parent instance of the recursive element, i.e., at a lower level in the hierarchy of the recursive element instances, then the attribute for the parent ID 1304 is set (at block 1410) to indicate no parent. Otherwise, if there is a parent instance of the processed instance of the recursive element, then the parent ID attribute 1304 is set (at block 1412) to the ID attribute value 1302 of the parent instance, for which a structured element statement would have been generated. If (at block 1414) there are further instances of the recursive element to process, control proceeds back to block 1404, else control ends.

With the operations of FIG. 14, the presence of the ID 1302 and parentID 1304 attribute values effectively encodes the hierarchical relationships within the data, without requiring those relationships to be explicitly reflected in the XML structures.

FIG. 15 illustrates an example of the non-hierarchical view output 124, where the element definition statements are non-hierarchical, with hierarchical relationship information reflected in the ID and parent ID attribute values.

The described embodiments provide techniques to terminate the number of levels at which instances of recursive elements are generated into view output to allow the user to tailor the schema view output for easier viewing. Further, with described embodiments, the user may create a view with a modified schema definition for recursive elements that transforms an element having a recursive type into a non-recursive type element with hierarchical information encoded in attributes of the structured element generated into the view output.

The described embodiments allow the user to tailor the display and rendering of instances of recursive elements in view output to optimize the viewing options for the user.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 16:
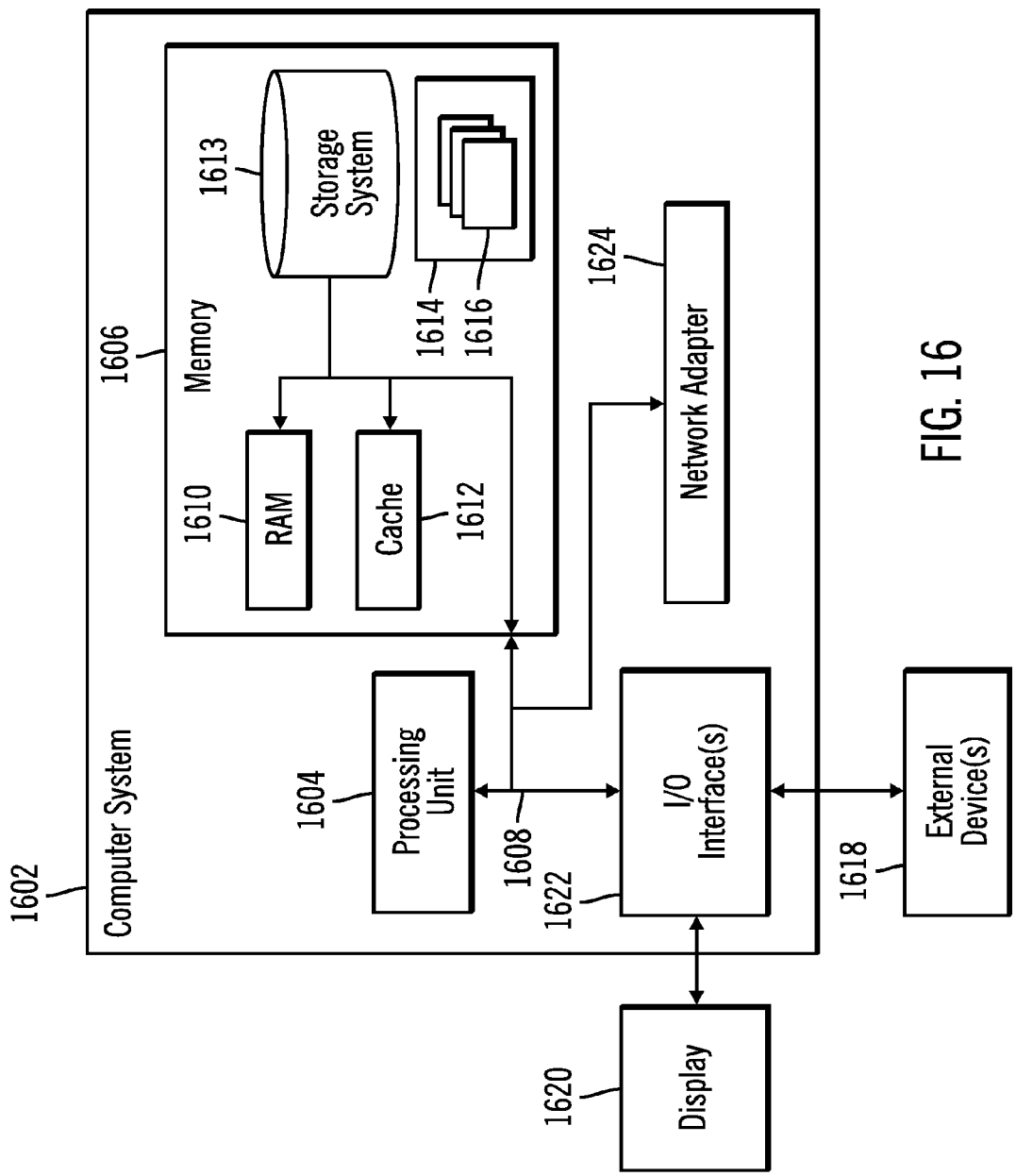
FIG. 16 illustrates an embodiment of computing components.

The elements of the computing environment of FIG. 1, including the client GUI 102, application server 104 and components 114, 116, 120, repository 106, and file system 108 may be implemented in one or more computer systems, such as the computer system 1602 shown in FIG. 16. Computer system/server 1602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, the computer system/server 1602 is shown in the form of a general-purpose computing device. The components of computer system/server 1602 may include, but are not limited to, one or more processors or processing units 1604, a system memory 1606, and a bus 1608 that couples various system components including system memory 1606 to processor 1604. Bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1602 typically includes a variety of computer system readable media. Such media may be any available media that is accessible by computer system/server 1602, and it includes both volatile and non-volatile media, removable and non-removable media.

System memory 1606 can include computer system readable media in the form of volatile memory, such as random access memory (RAM) 1610 and/or cache memory 1612. Computer system/server 1602 may further include other removable/non-removable, volatile/non-volatile computer system storage media. By way of example only, storage system 1613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1608 by one or more data media interfaces. As will be further depicted and described below, memory 1606 may include at least one program product having a set (e.g., at least one) of program modules that are configured to carry out the functions of embodiments of the invention.

Program/utility 1614, having a set (at least one) of program modules 1616, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 1616 which generally carry out the functions and/or methodologies of embodiments of the invention as described herein. The components 18, 24, 28, 48, and 50 of the computing environment 1 may be implemented in one or more computer systems 1602, where if they are implemented in multiple computer systems 1602, then the computer systems may communicate over a network.

Computer system/server 1602 may also communicate with one or more external devices 1618 such as a keyboard, a pointing device, a display 1620, etc.; one or more devices that enable a user to interact with computer system/server 12; and/or any devices (e.g., network card, modem, etc.) that enable computer system/server 1602 to communicate with one or more other computing devices. Such communication can occur via Input/Output (I/O) interfaces 1622. Still yet, computer system/server 1602 can communicate with one or more networks such as a local area network (LAN), a general wide area network (WAN), and/or a public network (e.g., the Internet) via network adapter 1624. As depicted, network adapter 1624 communicates with the other components of computer system/server 1602 via bus 1608. It should be understood that although not shown, other hardware and/or software components could be used in conjunction with computer system/server 1602. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for processing schemas and data in a storage system, comprising:

providing a schema, wherein the schema provides a definition of elements, wherein at least one of the elements comprises a recursive element of a recursive data type, wherein the recursive data type allows for instances of the recursive element to include instances of that same recursive data type at different levels in a hierarchy;

receiving indication to transform recursive data types to non-recursive structures; and generating a view for the schema including information on the indication to transform the recursive data types to non-recursive structure, wherein processing of the data defined by the view causes a parser to:

determine for a processed instance of a recursive element in the view whether the indication to transform the recursive data types to non-recursive structure for the processed instance indicates to terminate recursion;

generate a structured element for each instance of the recursive element in schema data being parsed that does not indicate to terminate recursion, wherein the generated structured element further includes a parent unique identifier of a parent instance of the instance for which the structured element is generated;

chunk data for the processed instance of the recursive element and for instances of recursive elements at higher levels of recursion within the processed instance in response to the indication to transform the recursive data types to non-recursive structure for the processed instance indicating to terminate recursion, wherein the generated structured element includes a unique identifier of the instance of the recursive element; and augmenting a definition of the recursive element for the schema in the view to include a first attribute for the unique identifier of the recursive element and a second attribute for the parent unique identifier.

2. The method of claim 1, wherein the generated structured elements comprise a non-recursive type definition, and wherein information on the levels of the hierarchy are encoded in the unique identifier and the parent unique identifier of the structured elements generated for the instances of the recursive element.

3. The method of claim 1, wherein the generated structured element includes an attribute parent identifier, wherein the attribute parent identifier is set to indicate no parent if the structured element is not a child in the hierarchy, and wherein the attribute parent identifier is set to attribute ID of the structured element for the parent instance of the structured element being generated.

4. The method of claim 1, wherein unique identifiers of the instances comprises a sequential number indicating an order in which the parser processed the instance of the recursive element when processing the instances of the recursive element.

5. The method of claim 1, wherein the generated structured element further includes a parent unique identifier of a parent instance of the instance for which the structured element is generated, wherein unique identifiers of the instances comprises a sequential number indicating an order in which the parser processed the instance of the recursive element when processing the instances of the recursive element, and wherein the parent unique identifier comprises the sequential number assigned to the instance of the recursive element comprising the parent instance.

* * * * *